(12) United States Patent
Yu et al.

(10) Patent No.: US 9,686,569 B2
(45) Date of Patent: Jun. 20, 2017

(54) METHOD, SYSTEM FOR CALIBRATING INTERACTIVE TIME IN A LIVE PROGRAM AND A COMPUTER-READABLE STORAGE DEVICE

(71) Applicant: INSTITUTE FOR INFORMATION INDUSTRY, Taipei (TW)

(72) Inventors: Chang-Hsien Yu, New Taipei (TW); Wen-shan Liou, New Taipei (TW); Hsin-I Lai, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 0 days.

(21) Appl. No.: 15/008,562

(22) Filed: Jan. 28, 2016

(65) Prior Publication Data
US 2017/0048557 A1 Feb. 16, 2017

(30) Foreign Application Priority Data
Aug. 12, 2015 (TW) .............................. 104126258 A (51) Int. Cl.
*H04N 21/2187* (2011.01)
*H04N 21/242* (2011.01)
*H04N 21/43* (2011.01)

(52) U.S. Cl.
CPC ....... *H04N 21/2187* (2013.01); *H04N 21/242* (2013.01); *H04N 21/4302* (2013.01)

(58) Field of Classification Search
CPC ............. H04N 21/242; H04N 21/2187; H04N 21/4302
See application file for complete search history.

(56) References Cited

U.S. PATENT DOCUMENTS

| | | | |
|---|---|---|---|
| 7,079,176 B1 | 7/2006 | Freeman et al. | |
| 7,478,240 B1 | 1/2009 | August et al. | |
| 7,634,798 B2 | 12/2009 | Watson | |
| 8,705,195 B2 | 4/2014 | Lockton | |
| 8,837,072 B2 | 9/2014 | Lockton et al. | |
| 2015/0052571 A1* | 2/2015 | Stokking .............. | H04N 21/242 725/116 |

* cited by examiner

*Primary Examiner* — Sumaiya A Chowdhury
(74) *Attorney, Agent, or Firm* — Li & Cai Intellectual Property (USA) Office (57) ABSTRACT

The disclosure is related to a method for calibrating an interactive time in a live program, and a system thereof. In the method, a user device is used to receive a live content embedded with a mark from a live program system. A signal processing scheme is performed to identify the mark so as to obtain a marking time. Then an interactive content is received from an interactive serving system. An initiating time of interactive activity is obtained. A time difference between the marking time and the initiating time is counted. The time difference is referred to for calibrating the time of issuing an interactive message when responding to the interactive activity. The responding time, at the system side, is restored to an actual time. Therefore, the method effectively excludes the time error for responding to the interactive activity in the live program due to transmission delay.

11 Claims, 6 Drawing Sheets

METHOD, SYSTEM FOR CALIBRATING INTERACTIVE TIME IN A LIVE PROGRAM AND A COMPUTER-READABLE STORAGE DEVICE

BACKGROUND

1. Technical Field

The present invention is generally related to a method and a system for calibrating time for interactive activity; in particular, to the method and the system for the calibration of interactive activity in a live program based on a characteristic value of the content.

2. Description of Related Art

In general, the production studio of a television show or a radio program broadcasts re-recorded programs in one way. The live program may allow an audience to make a comment by dialing in the live show as it is broadcast. However, the live program merely lets one audience participate in the program at one time. Further, in the modern show, the audience can give comments through simple message service (SMS) or a specific channel for the live program. These live messages can be shown in a split-screen inserted to a specific area of the live program displayed in a display.

With the widespread use of intelligent mobile devices and multiplicity of networks, now production studios that originally produce television shows or radio programs can provide live programs for the audience to interact with through mobile devices. In the television or radio program, a real-time interactive game is submitted for the audiences to play, using their mobile devices. The mobile devices are then required to install a specified application program. The application program is executed to synchronize with the live program as the game begins. In an example, the audiences can respond to the question using their mobile devices when the director asks for an answer in the live program. In the meantime, a server at the production studio receives the answers made by the audiences through the application program. This is different from only one person participating in the real-time interview with the director in the conventional program, as the modern radio program or television show can interact with many people at one time through this interactive activity.

Nevertheless, the mentioned interactive activity held between the user end mobile device and the server at the production studio over a network still meets a problem when the network environments where the audiences locate are variant. When the live program is delivered to audiences over the network, the interactive activity provided by the server host meets problems, for example the user end program is not synchronized with the live program. The network environments for people are varied since the live program can be broadcast over various transmission methods such as digital wired network, analog wired network, and digital broadcast that result in different transmission delays. The problem causes the interactive activity not to be synchronized among the audiences. The transmission delay makes the server host produce an error in determining the time of collecting audiences' responses during the procedure of the live game or a specific interactive activity. When the program result depends on the responding time made by the audiences, any delay will affect the audiences' interests.

SUMMARY

Provided in accordance with the present invention is to a method and a system for calibrating time of the live program when the system of a radio program or a television show wants to determine an actual order of the responses made by the audiences using their user devices over a network. One of the aspects is to set a characteristic mark in the broadcast content as a reference to calibrate a start time and an end time of the interactive activity in the live program. Therefore, the calibration can effectively prevent asynchronous problem between the interactive activity and the live program due to transmission delay.

According to one of the embodiments of the method for calibrating the interactive time in the live program, a user first operates a device to receive a live content embedded with a characteristic mark from a live program system. The live content is such as a live television show or radio program. In the user device, a signal processing means is next performed to identify a marking time of the characteristic mark in the live content. After that, an interactive content is received by the user device from an interactive serving system, and an initiating time of the interactive activity is acquired. Thus a time difference between the marking time and the initiating time of the interactive activity is computed. When the user participating in the activity manipulates the device to generate an interactive message, the time difference is used to calibrate the actual time of the interactive message based on the marking time. The interactive message with adjusted time is afterward transmitted to the interactive serving system.

The responding time of the interactive message can be corrected to an actual time when the interactive serving system receives the interactive message with adjusted time. Thus the error of the responding time caused by the transmission delay for the interactive activity in the live program can be prevented.

The system, which renders the interactive time in the live program, cooperates with an interactive serving system associated with a live program system, and also a software program executed in each of the user devices.

In the interactive serving system, the interactive activity is launched in response to an initiating signal generated by the live program system. The live program system then broadcasts a live content with a characteristic mark to multiple user devices. The function modules of the interactive serving system include an interactive content module used to broadcast the interactive content over a data network to the user devices; and an information receiving module used to receive the interactive messages generated by the user devices.

The functions of the program installed in the user device include a content receiving module used to receive the live content with the characteristic mark from the live program system; a content analysis module used to process the live content; a characteristic identifying module used to identify characteristic mark from the live content, so as to acquire a marking time; an interactive content receiving module used to receive the interactive content from the interactive serving system; an interactive activity initiating module used to initiate an interactive activity as the interactive content is received, so as to acquire an initiating time of the interactive activity; a time calibrating module used to compute a time difference between the marking time and the initiating time of interactive activity, so as to calibrate the time to generate the interactive message according to the time difference and marking time; and an interactive message generating module used to generate the interactive message and transmit the message to the interactive serving system.

The invention is related to an aspect of a computer-readable storage device. The storage stores an instruction set executed by a processor in each of the user devices for performing a method for calibrating the interactive time in the live program. The instruction set includes instruction for receiving a live content embedded with a characteristic mark from a live program system; instruction for identifying a marking time of the characteristic mark; instruction for receiving an interactive content from an interactive serving system; instruction for acquiring an initiating time of an interactive activity; instruction for computing a time difference between the marking time and the initiating time of the interactive activity; instruction for generating an interactive message with an adjusted time according to the time difference and the marking time; and instruction for transmitting the interactive message to the interactive serving system.

Thus, the time to issue the interactive message is required to be calibrated when the time difference between the marking time and the initiating time of the interactive activity is computed in the user device. The responding time made by the user device can be corrected to an actual time when the interactive serving system receives the interactive message. Any time error of the responding time due to the transmission delay in the interactive activity of the live program can be avoided.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

DESCRIPTION OF THE EXEMPLARY EMBODIMENTS

Reference will now be made in detail to the exemplary embodiments of the present disclosure, examples of which are illustrated in the accompanying drawings. Wherever possible, the same reference numbers are used in the drawings and the description to refer to the same or like parts.

The disclosure is directed to a method for calibrating the time of interactive activity held in a live program, and a system thereof in accordance with the present invention. One of the objectives of the method is to solve any signal delay problem from participating in interactive activity in a live program such as a TV show or radio program over a network. The live program renders an interactive activity over a data network, and the production studio of the live program has to determine an order of the responses made by the end users, or a deadline. However, it is unfair for some users who want to respond to the live program in time or try to be the first answerers because many people are participating in the program at the same time and they may be in various network environments. The disclosure is related to a method for calibrating the initiating time and the end time of the live program taking into consideration the transmission delay caused by the various network environments utilized by the end users. Thus the unfair situation can be solved.

Figure 1:
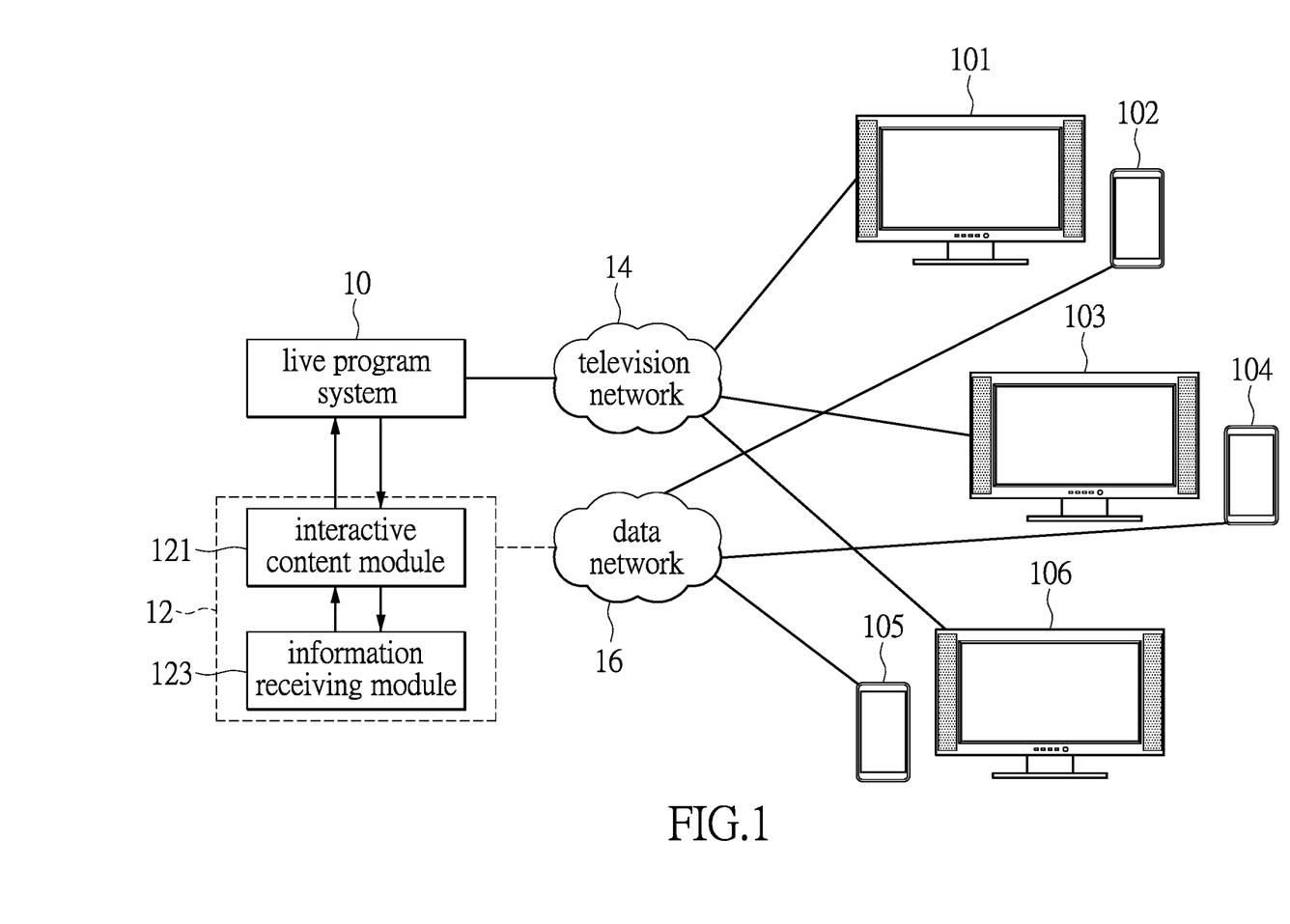
FIG. 1 shows a schematic diagram depicting the system framework in one embodiment of the present invention.

The circumstance embodying the disclosed method is referred to in FIG. 1 showing a schematic diagram of the system framework for implementing the calibration of the interactive time in the live program.

In the system framework, a live program system 10 is provided. The live program system 10 is such as a production studio that acts as a computer system initiating a live program. The live program system 10 broadcasts the live program, for example to the terminal displays 101, 103, 106 over a television network 14. The television network 14 may be a wireless or a wired network service, or a data network. The live program is therefore carried over the television network 14 and sent to the user end. In addition to the television show, the live program can be a radio program carried over radio waves. The terminal displays 101, 103 and 106 are such as a television or display disposed at the user end. The terminal device may be a radio machine for broadcasting the radio program.

The system includes an interactive serving system 12. The interactive serving system 12 can be a computer system. The functions inside may be implemented by software programs cooperated with a hardware device. The related function modules are such as an interactive content module 121 and an information receiving module 123. The interactive content module 121 is a server module used to broadcast interactive content to the user end. The interactive content module 12 broadcasts the interactive content to the user devices 102, 104 and 105 over the data network 16. The user end device is preferably the mobile device e.g. the cellular phone and tablet. The interactive serving system 12 utilizes an information receiving module 123 to receive the messages transmitted by the user end devices over the data network 16.

One of the ways of the user devices 102, 104 and 105 participating in the interactive activity is to install an interactive program with respect to the live program. Further, a web page may also act as an interface to conduct the interactive activity.

In an exemplary example, when the user utilizes one of the terminal displays 101, 103 and 106 to receive the live program broadcasted by the live program system 10 over the television network 14, one of the staff of the production studio announces starting an interactive activity. The live program system 10 immediately sends an initiating signal to the interactive serving system 12. At the moment, multiple user devices 102, 104 and 105 start receiving interactive content over the data network 16, initiating this interactive activity. The user manipulates a user device (102, 104, and 105) to operate the interactive program in response to instructions made by the live program. A response is therefore generated. For example, the user may manipulate the user device to answer questions by using true/false or making a selection, or to vote for a specific issue. Next, the information receiving module 123 of the interactive serving system 12 receives the message from every user end device over the data network 16. After integrating the received messages, a result is produced based on the attribute of the interactive activity.

As the interactive activity is in process, the user may make a response to respond to the live program. However, the various network environments the users locate may result in different transmission delays. The transmission delays cause the interactive serving system 12 to generate an unfair result because the result is made based on a time order as receiving the messages from the user devices, or a deadline of the live program. Thus, provided in the disclosure is a method for calibrating the interactive time of the live program and the system for implementing the method.

In the method for calibrating the interactive time in a live program, a characteristic mark is embedded in the content provided by a live program system, and the characteristic mark is such as a watermark. The watermark may be a visible or invisible mark embedded into the content. In an example, a live video has been embedded with recognizable characteristic mark such as pattern, clip, code, and voiceprint in advance; or a live radio is embedded with voiceprint or code that acts as a reference for time calibration.

Figure 2:
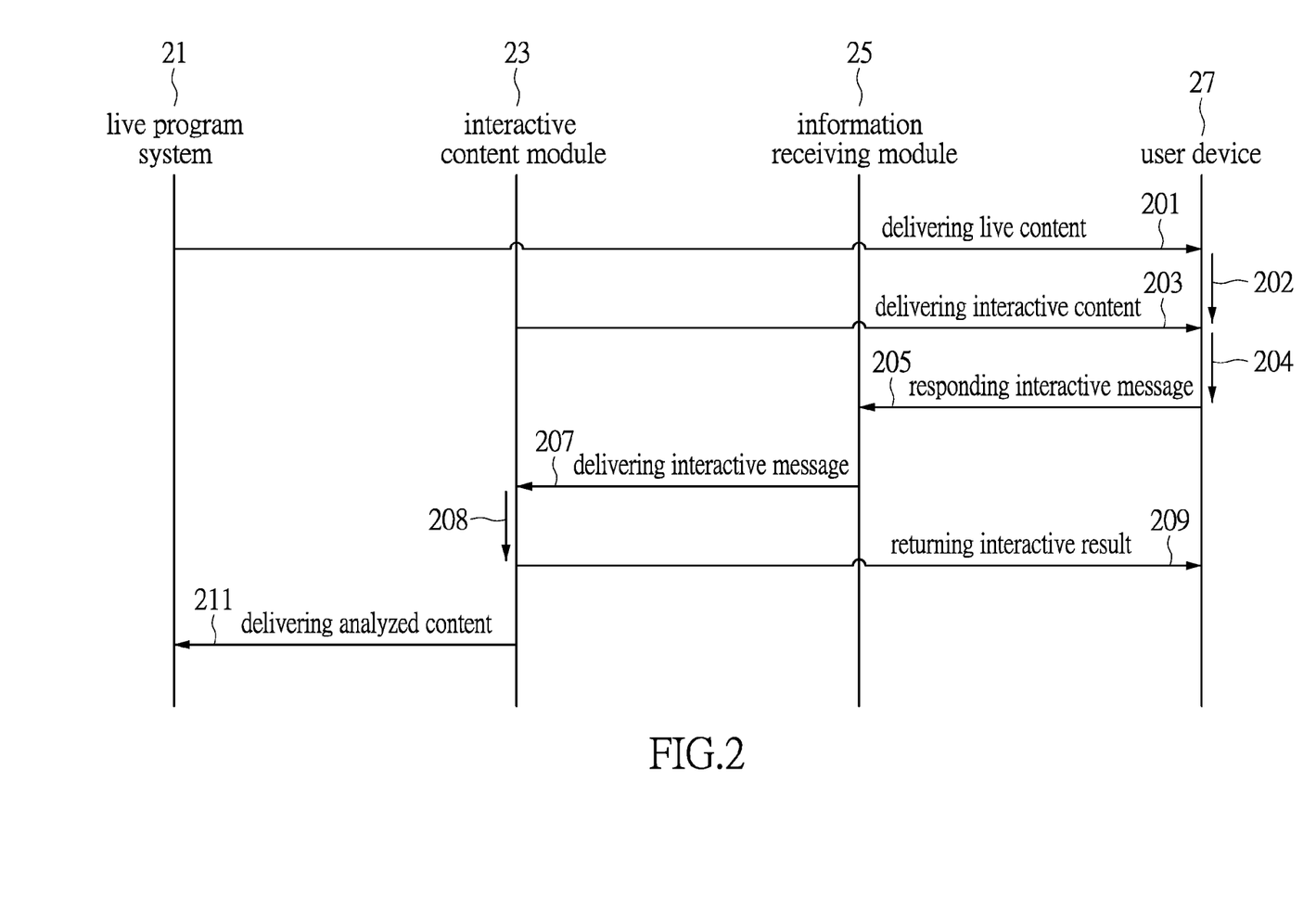
FIG. 2 shows a flow chart depicting the method for calibrating the interactive time in a live program according to one of the embodiments of the present invention.

Reference is made to FIG. 2 showing a flow chart describing the method for calibrating interactive time in a live program for a system in accordance with the present invention.

The method is applied to an operation between a live program system 21 and a user device 27. The live program system 21 includes an interactive content module 23 and an information receiving module 25. The live program system 21 is used to provide the live video or radio that is inserted with a characteristic mark. The interactive content module 23 is used to submit an interactive activity over a data network. The information receiving module 25 is used to collect the messages made by the user device 27. The user device 27 is such as a terminal display and a mobile device.

In the process, the user device 27 such as a television or a display is employed to watch the live content broadcast by the live program system 21, as shown in step 201. Alternatively, the live program system 21 may broadcast the video or radio program. The user can utilize the television to watch the live program; in addition the any of the user's mobile devices is used to receive the live content. The audio, video or radio program is in advance embedded with a characteristic mark. This characteristic mark is configured to be a recognizable mark to the software executed in the user device 27. When the software recognizes the characteristic mark as the live content is received, such as in step 202, a marking time is recorded.

Next, an interactive activity can be initiated when the live program is broadcast. The interactive content is then transmitted to the user device 27 over the data network, as shown in step 203. The software receives the interactive content and the interactive activity begins. In the meantime, the user device 27 acquires a time difference between the marking time and the initiating time of the interactive activity. The time difference acts a basis to calibrate the time of the interactive activity. The interactive message can be created corresponding to the responses or input from the user, as shown in step 204. The interactive message is such as an item, icon, text or an answer inputted by the user through a user interface. The interactive message is then transmitted back to the system's information receiving module 25, as shown in step 205. The information receiving module 25 transmits the message to the interactive content module 23, as shown in step 207. Alternatively, the information receiving module 25 integrates the messages sent by multiple user end devices, and then the integration is transmitted to the interactive content module 23.

The interactive content module 23 is used to process the received interactive messages, as shown in step 208. An interactive result is produced and sent to the user device 27, as shown in step 209. The interactive result may be, but is not limited to, a notice of whether or not the answer is correct, a notice of receiving a vote, notice of received, or an end time of the interactive activity.

In one embodiment of the present invention, when the system, e.g. the interactive content module 23, receives the messages submitted by the user end devices, a statistical analysis is performed onto the messages. The analysis acquires a number of participants and a time distribution of the responding times made by multiple users. The analyzed content and result can be feedback to the live program system 21, as shown in step 211, and referred to, as a reference for decision-making for the next activity.

Further, when the user device 27 receives the live program transmitted by the live program system 21, as shown in step 201, the software-implemented signal processing method is used to identify the time of the characteristic mark appearing, as shown in step 202. The marking time may be a reference basis for calibrating the time in the live program. The system performs a video processing method or an audio processing method according to an attribute of the received signals, so as to identify the characteristic mark. In the video processing method, the characteristic mark can be identified by comparing the frame information of the video with the features extracted from the characteristic mark. In the audio process method, the characteristic mark can be identified by comparing the signals with the features of the voiceprint embedded in the video or audio. The live radio program essentially employs the audio processing method to have the voiceprint.

When the interactive activity is in progress, the user device 27 can record an initiating time of the interactive activity as the interactive content is received, as shown in step 203. Therefore, a time difference between the initiating time and the marking time can be simultaneously computed. This time difference corresponds to the initiating time of the interactive activity in the live program, and is used to be a reference for calibrating the initiating time of the interactive activity in the user device 27. The calibration is used to compensate the time shift due to a transmission delay resulting in asynchronous problem between interactive activity and the live program. The system is therefore able to return the time to a correct responding time as the interactive message made by the user device 27 is received. Thus the error to the responding time caused by the transmission delay in the interactive activity of the live program can be corrected. The end time of the interactive activity can also be adjusted.

Figure 3:
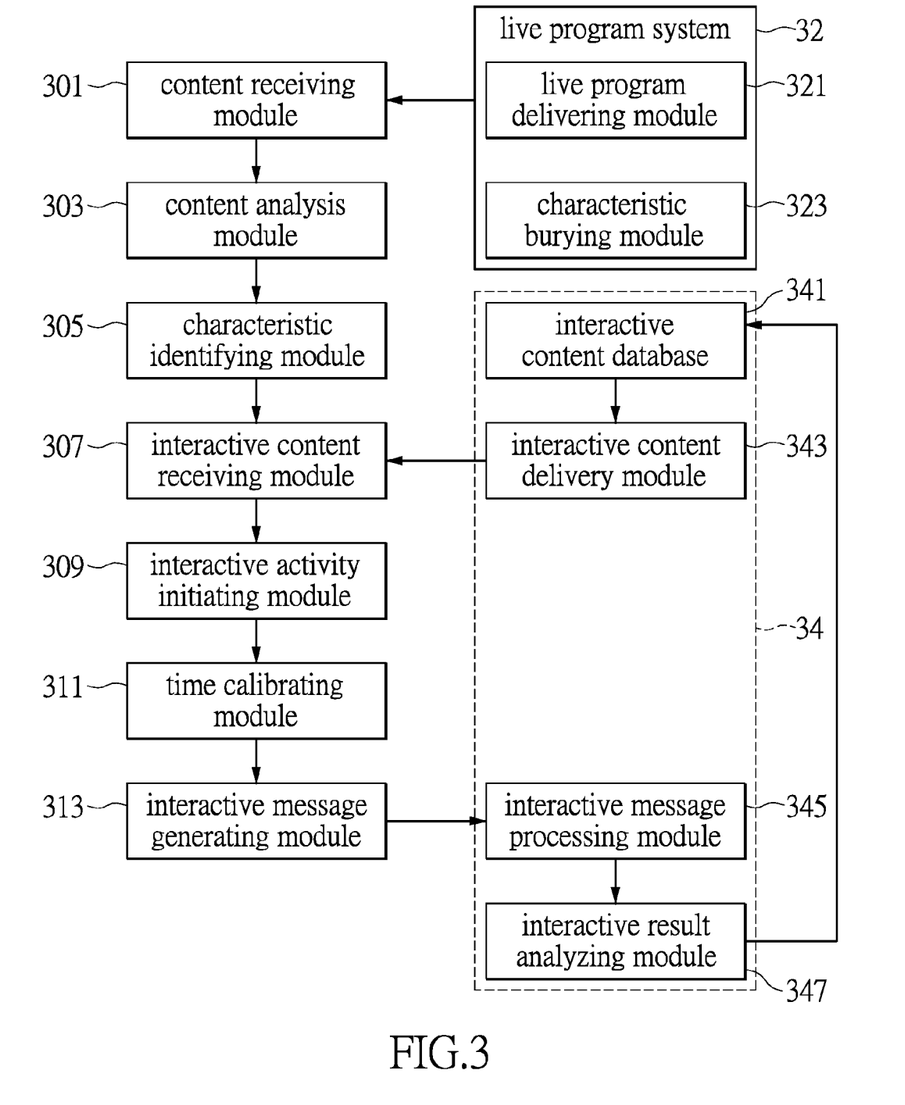
FIG. 3 shows a diagram describing the function modules of the system for implementing the calibration of the interactive time in the live program according to the embodiment of the present invention.
Figure 4:
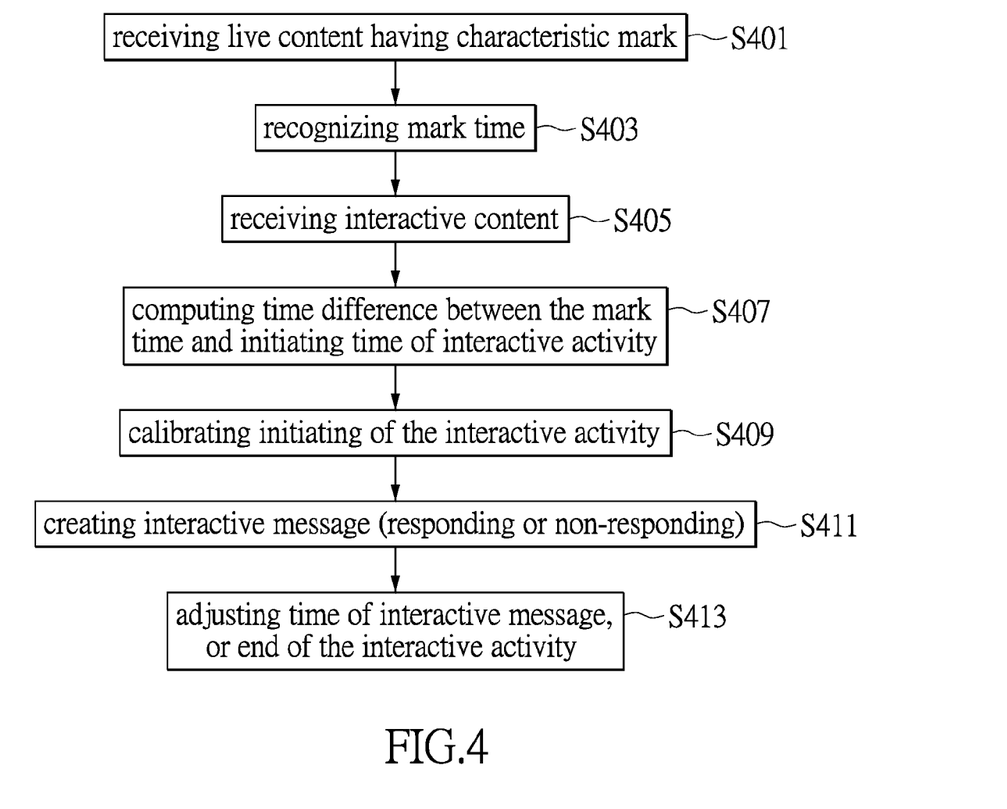
FIG. 4 shows a flow chart describing the method for calibrating the interactive time in the live program according to one embodiment of the present invention.

FIG. 3 shows a schematic diagram depicting the function modules of the system for performing the method described in the flow chart of FIG. 2. The flow chart shown in FIG. 4 is also referred to depict the system.

The user end device such as mobile phone, tablet or notebook is described at the left side of the diagram of FIG. 3. The diagram shows the software modules stored in a computer-readable storage device in form of instructions in the user device. The instructions can be implemented as an application installed in the user device such as APP for mobile device, a software package or an exe file. The instructions are executed by a processor of the user device performing the method for calibrating interactive time in a live program. The instructions include an instruction for receiving a live content embedded with a characteristic mark from a live program system; instruction for identifying a marking time of the characteristic mark; instruction for receiving an interactive content from an interactive serving system; instruction for acquiring an initiating time of an interactive activity; instruction for computing a time difference between the marking time and the initiating time of the interactive activity; instruction for generating an interactive message with an adjusted time according to the time difference and the marking time; and instruction for transmitting the interactive message with the adjusted time to the interactive serving system.

The main functions of the software modules are performed by a content receiving module 301, a content analysis module 303, a characteristic identifying module 305, an interactive content receiving module 307, an interactive activity initiating module 309, a time calibrating module 311, and an interactive message generating module 313.

The right side of this diagram shows a live program system 32. In the live program system 32, a live program delivering module 321 and a characteristic burying module 323 are included. An interactive serving system 34 collocated with the live program system 32 is also provided. The interactive serving system 34 includes an interactive content database 341, an interactive content delivery module 343, an interactive message processing module 345, and an interactive result analyzing module 347.

The live program system 32 provides a computer system of a production studio for rendering the live content. A characteristic mark is such as a title of a film or a cut-scene having a watermark. The characteristic mark defines a start time of the interactive activity in the live program. For example, when a director of a live program announces starting an interactive activity, the interactive serving system 34 receives a signal of the announcement and starts broadcasting the interactive content.

In the process of the method for calibrating the interactive time in the live program, the live program system 32 firstly utilizes the characteristic burying module 323 to bury a recognizable characteristic mark into the live content, including live video and radio audio. The live program delivering module 321 is then used to broadcast the live content having the characteristic mark to the user device over wired or wireless connection. The content receiving module 301 of the user device receives the live content, as shown in step S401 of FIG. 4.

Next, in the user device, the content analysis module 303 is used to process the live video or audio. For example, the live content is delivered in streaming progress. The information relating to frames and timestamps can be extracted from the streaming signals. The characteristic identifying module 305 in the user device recognizes the characteristic mark. The frames may be used to be compared with the predetermined characteristics such as the specified pattern, symbol, codes, or voiceprint, so as to obtain the characteristic mark in the live content, as shown in step S403. The time appearing the characteristic mark is recorded.

The interactive serving system 34 will not initiate the interactive activity until an initiating signal of the interactive activity is generated in the live program. The interactive content delivery module 343 of the interactive serving system 34 retrieves the interactive content from the interactive content database 341. The interactive content is broadcast to the user device over a data network. The interactive content receiving module 307 in the user device receives the content, and the initiating time for initiating the interactive activity. The interactive content receiving module 307 acquires some timings of the interactive activity. The timing during the interactive activity may have the initiating time for the interactive activity, the time period of the whole interactive activity, and even a deadline for receiving the responses.

The interactive activity initiating module 309 initiates the interactive activity, as shown in step S405, including guiding the user to participate in the activity through an interactive user interface created in a display of the user device and the interactive video/audio. An interactive message is then generated by the user device.

In the period of the interactive activity, such as in step S405 to step S407, a time difference between the marking time and the initiating time of the interactive activity is computed. The time difference and the marking time act as references for compensating the delay in the interactive activity using the time calibrating module 311 of the user device. The initiating time, end time of the interactive activity, and the deadline for collecting the responses are also adjusted, as shown in step S409. Further, the interactive activity may ask the participant to respond to the program using their user device, as shown in step S411. The participant uses their device to generate an interactive message as a response. The time calibrating module 311 in the user device can calibrate the responding time according to the aforementioned time difference. It is noted that the time to submit the interactive message can be calibrated based on the timing reference of the recognized characteristic mark. The interactive message generating module 313 then transmits the interactive message with adjusted time to the interactive message processing module 345 of the interactive serving system 34. When the interactive serving system 34 receives the interactive message with adjusted time, the mentioned calibration at the user device allows the system to return to the actual responding time. The problem of the response transmitted over a data network which induces the time shift due to the transmission delay can be prevented, such as in step S413, where in response to the time difference, the time when the participant generates the interactive message can be calibrated. In some cases the time may also have to be calibrated due to the participant being late in responding to the program and as well the interactive activity has already reached the end time or the deadline to collect the responses.

In the interactive serving system 34, when the interactive message processing module 345 receives the interactive message with adjusted time, having the information of the response or no response, made by the user device, the interactive result analyzing module 347 performs statistical analysis onto the messages. The analysis allows the system, e.g. the production studio, to refer to the distribution of delays and the distribution of the responding times for the next interactive activity's reference.

Figure 5:
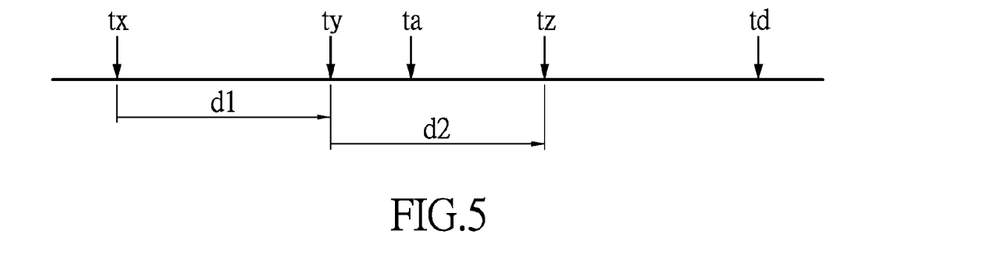
FIG. 5 shows a schematic diagram depicting the time information in the system for calibrating the interactive time in the live program in one embodiment of the present invention.

Reference is made to FIG. 5. In the diagram, a variety of information over a timeline of operating the interactive activity is schematically shown.

Time 'tx' on the timeline represents the time that the characteristic mark appears in the live content and is recognizable to the user device. The time of the characteristic mark acts as a reference to perform the calibration. Next, the system delivers the interactive content and starts the interactive activity. Time 'ty' represents the initiating time of the interactive activity. The time period 'd1' represents the time difference between the time 'tx' and the time 'ty'. The time period 'd2' represents the duration of the interactive activity.

The interactive activity proceeds from the initiating time 'ty' to an end time 'tz'. The interactive message created by the user device at time 'ta.' which can be calibrated according to the time period 'd1' and the time 'tx' of the characteristic mark. The calibration allows the system to obtain the actual responding time and the user's response can be fairly treated after the reason of transmission delay is excluded.

If the user does not respond the program when the end time 'tz' is reached, the system acknowledges that there is no interactive message created during the time period of the interactive activity. Further, in another situation, a deadline 'td' is at the end of an extended period of time from the end time of the interactive activity. The deadline shows the system can open more time to collect the responses from the user devices. The above-mentioned times can be calibrated according to the time difference between the marking time and the initiating time of the interactive activity. In the live program the system is able to dynamically adjust the time of the end of the interactive activity or the deadline of receiving responses according to the responding times and/or the response number of the interactive messages.

The above-mentioned time information from the user end device is beneficial for the system to establish the database and perform further analysis.

In an exemplary example described in FIG. 6A through FIG. 6D, an interactive game is initiated when the live program is in progress. In the game a director requires the end users to try to be the first answerer to his question, or make response by a preset time. The production studio of the live program will reward the answerers according to their responding times and answers. In order to be fair to judge the end users' answers, the system can calibrate the responding times made by those users according to the various transmission delays, or tune the time period of deadline for collecting the users' responses in the live program. Thus the scheme can effectively solve the unfair condition since the time shifts of the responding times, the end time of the game, and/or the deadline for the responses can be eliminated from the participants' transmission delay.

Figure 6A:
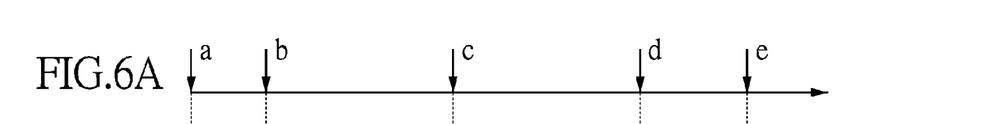
FIG. 6A through FIG. 6D schematically show the time information in the system for calibrating the interactive time in the live program in one embodiment of the present invention.

Reference is made to FIG. 6A showing the original time information of a live program and an interactive game. Time 'a' represents starting broadcasting a video which is embedded with a characteristic mark. Next, the software in a user device recognizes the characteristic mark and retrieves a marking time 'b'. After the user end device receives a signal from the system, the user device gets an initiating time 'c' of the interactive game. Time 'd' represents an end time of the interactive game, and time 'e' is the deadline for collecting the responses with respect to the interactive game.

Figure 6B:
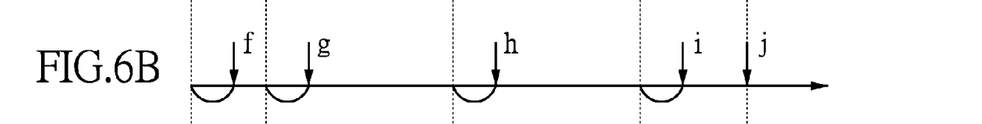

FIG. 6B schematically shows an example that depicts the delays of the times in the live program due to the transmission delay.

The figure shows a delay occurs when the user device receives the live video from the system in the beginning, as represented by time 'f'. It appears a time difference between the time of receiving the live video and the actual time to broadcast the video. Time 'g' represents the time of recognizing the characteristic mark in the video. Similarly, this time 'g' has a time shift from the predetermined marking time. Time 'h' represents the time to initiate an interactive game with the similar time shift. Because the delay of the live video has been acknowledged in the beginning, it derives the adjustment of the end time 'I' of the game. However, the deadline 'j' may not to be adjusted in this case.

It is noted that whether or not the deadline 'j' needs to be adjusted can refer to a time distribution of the past responding times. In an exemplary example, when the statistics of past time distribution shows most of the responses collected from the user devices are located before the deadline 'j', in this case, the system may consider not to adjust the deadline 'j'. Otherwise, when the past time distribution shows most responses or a specific number of responses are located around the deadline 'j', the system may consider adjusting the time period of deadline to collect the responses.

Figure 6C:
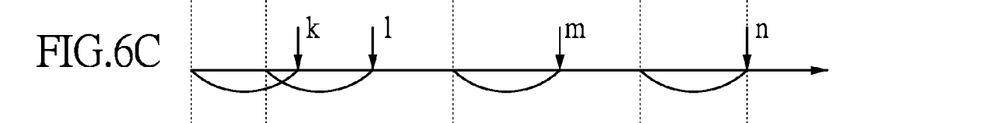

FIG. 6C shows another case with another time shift. Time 'k' represents a start point of broadcasting a live video. It apparently shows a longer time difference in the beginning Time 'l' represents the time to recognize a characteristic mark in the live video. Time 'm' indicates a time to initiate a live game. It appears that the end time 'n' of the live game is close to the preset deadline for having the responses. In this case, the deadline may not to be adjusted.

Figure 6D:
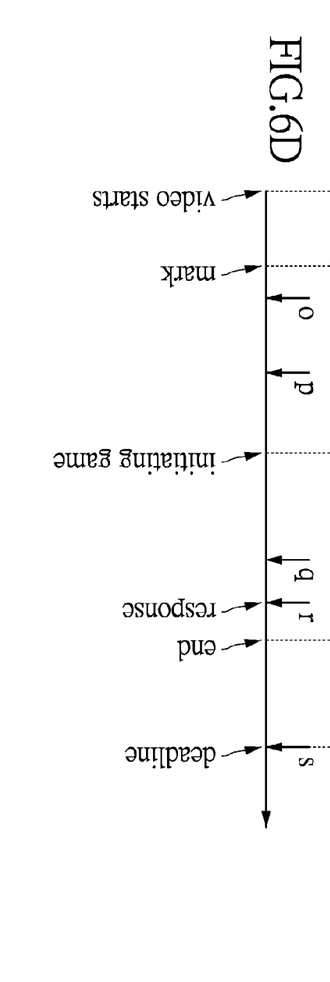

In FIG. 6D, the user device receives a live video at time 'o' late from the beginning of broadcasting the live video. After a while, the characteristic mark in the video is recognized at time 'p'. Because the transmission delay occurs, the time to initiate the game shall be deferred to time 'q'. In this case, one of the users responds to the game at time 'r' before the end time and the deadline 's' of the game. Since a time difference between the marking time and the initiating time of the game has been acquired, the software of the user device accordingly calibrates the responding time 'r'. The calibration performed to the responding time 'r' is based on the marking time and is able to compensate the time shifts due to various circumstances such as the transmission delay. The scheme allows the system to return the time to the actual time of any activity in the live program.

If the type of game encourages the users to be the first answerer, the system will fairly compare the responding times after the time calibration. If the type of game requires the users to respond within a period of time, it is fair that the time calibration allows the system to collect the responses by the calibrated deadline without dropping any data due to the transmission delay.

Figure 7:
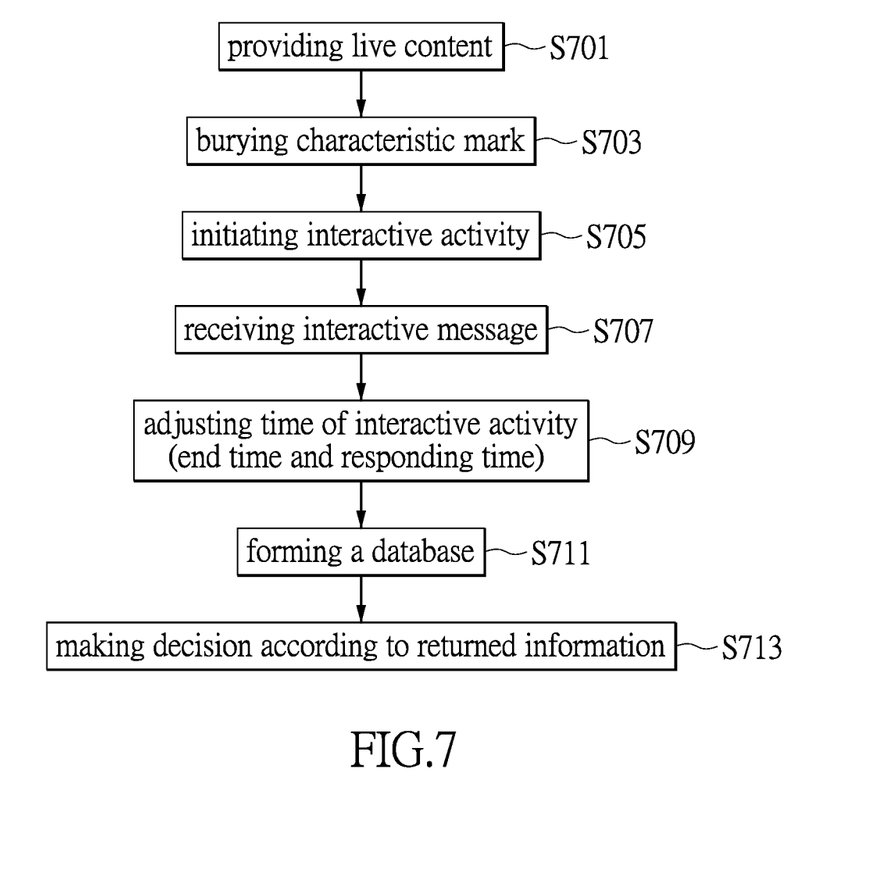
FIG. 7 shows a flow chart describing the method in the system in one embodiment of the present invention.

In the method for calibrating the interactive time in the live program, the interactive serving system renders a reference for decision-making in response to a statistical analysis of the responding times or a response number of the interactive messages made by the multiple users. Since the time distribution is obtained by statistically analyzing each of the responding times with respect to each of the user devices, the analysis is referred to as a time reference for making future decisions. FIG. 7 shows a flow chart describing the process in one embodiment of the invention.

In the beginning, such as in step S701, the system provides a live program for interacting with end users. In the system, such as in step S703, a characteristic mark is buried to the live content according to a pre-determined time. This marking time becomes a reference to calibrate the times of the interactive messages made by the users. This marking time is well known by the system, and is used as one of the factors for the statistical analysis.

Next, such as in step S705, the system initiates an interactive activity, and transmits the data to the user device. The user device then recognizes the characteristic mark in the live content. A time difference is therefore computed between the marking time and the initiating time of the interactive activity. The time difference is incorporated to calibrate the time with respect to the interactive message. In step S707, the system receives the interactive message generated by the user device. The time period of the interactive activity can be adjusted according to the time information sent from the user device. The time period includes an end time of the interactive activity and a deadline for collecting the responses in the interactive activity, as shown in step S709. A database is therefore established, as in step S711. With statistical analysis, the database is used to produce a time distribution regarding the response times of interactive messages and response number, as shown in step S713. The distribution acts as the reference for decision-making for the interactive activity. In one embodiment, the system dynamically adjusts the time to broadcast the live content, the initiating time of interactive activity, or deadline of the activity according to the distribution of the responding times or the response number.

In an exemplary example, when the system establishes a time distribution histogram by accumulating enough data regarding time information of interactive messages, the percentages of various responding times and/or corresponding response number can be obtained. The information is provided for the system to set the deadline in the future activities. For example, the time to deadline may be shortened when the histogram shows most responses are made within a specific range of percentages located in the beginning of the interactive activity, and few users make the responses close to the deadline. Otherwise, if the histogram shows a certain percentage of users respond to the activity close to the deadline, the period of time to the deadline can be prolonged.

Thus the method for calibrating the interactive time in the live program is primarily applied to the interactive activity provided by the interactive serving system. The interactive activity may suffer the transmission delay because the interactive content and messages are transmitted over a data network. Any delay will affect the responding time made by the anticipant in the interactive activity. In the method, a mark is pre-determined in the live content, and the marking time acts as a reference to calibrate the interactive time in the live program. The system returns the time to create the interactive message to the actual time and therefore solves the asynchronous problem due to the transmission delay. The messages made by the users can also be the references for the system to adjust the deadline of the activity.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A method for calibrating interactive time in a live program, wherein the method is performed in a user device, comprising:

receiving a live content having a characteristic mark from a live program system;

identifying the characteristic mark for acquiring a marking time, and wherein the characteristic mark is a watermark or a voiceprint embedded in the live content;

receiving an interactive content from an interactive serving system that starts broadcasting the interactive content to the user device in response to an initiating signal generated by the live program system, and obtaining an initiating time of an interactive activity;

computing a time difference between the marking time and the initiating time of the interactive activity;

generating an interactive message with an adjusted time according to the time difference and the marking time;

transmitting the interactive message to the interactive serving system over a data network; and calibrating the initiating time of the interactive activity, an end time and/or a deadline of response according to the time difference and marking time for preventing asynchronous interactive activity and the live program due to transmission delay.

2. The method of claim 1, wherein the live content is a television show or a radio program.

3. The method of claim 1, wherein the characteristic mark is identified through a video processing method or an audio processing method.

4. The method of claim 1, further comprising the interactive serving system rendering a reference for decision-making in response to a responding times or a response number of the interactive messages made by the multiple user devices.

5. A system for calibrating interactive time in a live program, comprising:

an interactive serving system, used to initiate an interactive activity in response to an initiating signal, and used to broadcast a live content with a characteristic mark to multiple user devices, wherein the interactive serving system comprises:

a processor configured to:

broadcast an interactive content to the multiple user devices, in response to the initiating signal generated by the live program system, over a data network;

receive an interactive message generated by each of the user devices;

wherein each of the user devices comprises:

a processor configured to:

receive the live content with the characteristic mark from the live program system, and wherein the characteristic mark is a watermark or a voiceprint embedded in the live content;

analyze the live content;

identify the characteristic mark from the live content and acquire a marking time;

receive the interactive content from the interactive serving system;

initiate the interactive activity when receiving the interactive content and acquire an initiating time of the interactive activity;

compute a time difference between the marking time and the initiating time of the interactive activity, and used to adjust the time of interactive message in response to the time difference and the marking time;

generate the interactive message with an adjusted time and transmit the interactive message with the adjusted time to the interactive serving system; and calibrate the initiating time of the interactive activity, an end time and/or a deadline of response according to the time difference and marking time for preventing asynchronous interactive activity and the live program due to transmission delay.

6. The system as recited in claim 5, wherein the live content is a television show or a radio program.

7. The system as recited in claim 6, wherein, after the interactive serving system receives the interactive messages generated by the plurality of user devices, a time distribution is obtained by statistically analyzing each of the responding times with respect to each of the user devices; and the time distribution is referred to as a reference for decision-making.

8. The system of claim 5, wherein the characteristic mark is identified through a video processing method or an audio processing method.

9. The system of claim 8, wherein, when the interactive serving system receives the interactive messages made by the multiple user devices, the reference for decision-making is rendered by a statistical analysis performed to obtain a time distribution of the responding times made by the multiple user devices.

10. The system of claim 5, wherein, when the interactive serving system receives the interactive messages made by the multiple user devices, the reference for decision-making is rendered by a statistical analysis performed to obtain a time distribution of the responding times made by the multiple user devices.

11. A computer-readable storage device, storing instructions executed by a processor of a user device for performing a method for calibrating interactive time in a live program comprising:

receiving a live content embedded with a characteristic mark from a live program system, and wherein the characteristic mark is a watermark or a voiceprint embedded in the live content;

identifying a marking time of the characteristic mark;

receiving an interactive content from an interactive serving system that starts broadcasting the interactive content to the user device in response to an initiating signal generated by the live program system;

acquiring an initiating time of an interactive activity;

computing a time difference between the marking time and the initiating time of the interactive activity;

generating an interactive message with an adjusted time according to the time difference and the marking time;

transmitting the interactive message to the interactive serving system; and calibrating the initiating time of the interactive activity, an end time and/or a deadline of response according to the time difference and marking time for preventing asynchronous interactive activity and the live program due to transmission delay.

\* \* \* \* \*